United States Patent [19]

Ito et al.

[11] Patent Number: 5,307,673
[45] Date of Patent: May 3, 1994

[54] WEAR-DETECTION PROBE FOR A BRAKE LINING MATERIAL

[75] Inventors: Katsuya Ito; Fumiyoshi Tanigawa, both of Mie, Japan

[73] Assignee: Sumitomo Wiring Systems, Ltd., Mie, Japan

[21] Appl. No.: 987,457

[22] Filed: Dec. 7, 1992

[30] Foreign Application Priority Data

Dec. 13, 1991 [JP] Japan .................... 3-110020[U]

[51] Int. Cl.$^5$ .......................... G01L 5/28; B60Q 1/00
[52] U.S. Cl. ...................................... 73/129; 340/454
[58] Field of Search ................. 73/121, 129; 340/453, 340/454

[56] References Cited

U.S. PATENT DOCUMENTS

| | | | |
|---|---|---|---|
| 3,415,115 | 12/1968 | Newell | 73/121 |
| 3,674,114 | 7/1972 | Howard | 340/454 |
| 3,689,880 | 9/1972 | McKee et al. | 340/454 |
| 3,886,517 | 5/1975 | Ohtake et al. | 340/52 F |
| 3,894,901 | 7/1975 | Breher | 264/278 |
| 3,896,205 | 7/1975 | Broker et al. | 264/278 |
| 4,016,533 | 4/1977 | Ishikawa et al. | 340/454 |
| 4,147,236 | 4/1979 | Steffen et al. | 340/454 |
| 4,292,267 | 9/1981 | Haynes | 264/278 |
| 4,318,457 | 3/1982 | Dorsch et al. | 340/454 |
| 4,437,547 | 3/1984 | Harmer | 340/454 |
| 4,520,661 | 6/1985 | Tamai et al. | 73/129 |
| 4,562,421 | 12/1985 | Duffy | 340/454 |
| 4,606,435 | 8/1986 | Johnson | 340/454 |
| 4,646,001 | 2/1987 | Baldwin et al. | 340/454 |
| 5,158,734 | 10/1992 | Nees | 264/278 |

FOREIGN PATENT DOCUMENTS

| | | | |
|---|---|---|---|
| 0321661 | 9/1988 | European Pat. Off. | |
| 0465954 | 1/1992 | European Pat. Off. | |
| 1045259 | 11/1958 | Fed. Rep. of Germany | 340/454 |
| 2407517 | 8/1975 | Fed. Rep. of Germany | 340/454 |
| 3904673 | 8/1990 | Fed. Rep. of Germany | |
| 9010354 | 9/1990 | Fed. Rep. of Germany | |
| 2504226 | 4/1981 | France | |
| 55-149434 | 11/1980 | Japan | |
| 4-95701 | 3/1992 | Japan | |
| 2015099 | 9/1979 | United Kingdom | 340/454 |
| 2058968 | 4/1981 | United Kingdom | |
| 2194824 | 3/1988 | United Kingdom | |

OTHER PUBLICATIONS

Japanese Unexamined Utility Model Publication No. 62-97332, Jun. 20, 1987 (no translation).
Japanese Unexamined Utility Model Publication No. 62-97332, Jun. 20, 1987 (with translation).

*Primary Examiner*—Hezron E. Williams
*Assistant Examiner*—George Dombroske
*Attorney, Agent, or Firm*—Sughrue, Mion, Zinn, Macpeak & Seas

[57] ABSTRACT

An object of the present invention is to provide a wear-detection probe for a brake lining material which prevents a U-turned portion 61 of a detector K from shifting in a housing and avoids an increase of parts and steps of forming the probe 50. A hole 53 is formed within part of the inner periphery of an insulated electrical wire 60 in a housing 55 by drawing out of the housing 55 a pin 100 which serves to prevent the wire from being shifted in a mold upon mold-forming. A reinforcement bridge 54 is integrally formed in the hole 53 by the same resin material 70 as that 70 of the housing 55. Since the reinforcement bridge 54 is integrally formed in the hole 53 made by drawing the pin 100 out of the molded housing 55, it is possible to increase the strength of the probe 50 and to position the U-turned portion 61 in the housing 55 by the support of the reinforcement bridge 54. Also, it is possible to avoid an increase of parts and steps of producing the probe, since the reinforcement bridge is integrally formed in the molded housing.

2 Claims, 5 Drawing Sheets

WEAR-DETECTION PROBE FOR A BRAKE LINING MATERIAL

BACKGROUND OF THE INVENTION

1. Field of the Invention

This invention relates to a wear-detection probe for a brake lining material such as a brake pad for a disc brake in a vehicle or the like.

2. Statement of the Prior Art

For convenience of explanation, a conventional wear-detection probe for brake lining material will be described below by referring to FIGS. 5 through 9.

FIG. 5 is a side view showing a conventional disc brake for a vehicle.

As shown in FIG. 5, a disc brake 1 for a vehicle generates a braking force by pressing a pair of brake lining materials such as brake pads 3 or the like on both sides of a rotor 2 which rotates in connection with the rotation of the wheels. In this disc brake 1, a probe 10 juxtaposed with the brake pad 3 detects the residual thickness of the pad 3 worn by contact with the rotor 2, so that a warning signal can be generated before the brake pads are overworn.

FIG. 6 is a plan view of a conventional wear-detection probe 10 for a brake pad 3. FIG. 7 is a cross-sectional view taken along lines VII—VII in FIG. 6. FIG. 8 is a perspective view of the conventional probe shown in FIG. 6. The probe 10 comprises a housing 13 molded by a resin material 12, an insulated electrical wire 11, and a detector K having a U-turned portion 11a of the wire 11. The U-turned portion 11a is embedded in the resin material 12.

The probe 10 is secured to the rear metal 3a of the brake pad 3 at a flange 10b so that the top end 10a of the probe 10 is directed to the rotor 2 and both ends of the insulated electrical wire 11 are drawn out of the probe 10 so as to be connected to an alarm circuit (not shown). The brake pad 3 is worn due to contact with the rotor 2 every time the brake is operated, and the top end 10a of the probe 10 is also worn with reduction of the residual thickness of the brake pad 3. Consequently, the U-turned portion 11a is gradually worn. When the residual thickness of the brake pad reaches a predetermined value, the U-turned portion 11a is cut off. The alarm circuit detects the disconnection of the U-turned portion and generates a warning signal.

Thus, since a wear limit of the residual brake pad 3 is detected by the disconnection of the U-turned portion 11a, it is necessary to accurately position the U-turned portion 11a in the resin material 12, in particular, in a wear-progressing direction A (see FIG. 6) with respect to the residual thickness of the brake pad 3.

Accordingly, in a conventional method of producing the probe 10, as shown in FIG. 9, first, the insulated electrical wire 11 is disposed around a pin 20 mounted in a mold (not shown) to form the U-turned portion 11a, and second, a molten resin material is poured into the mold while holding the wire by the pin 20 so that the wire does not shift in the mold. The resin material solidifies in the mold so that the electrical wire 11 is correctly positioned in the molded resin material 12.

However, after molding the probe 10, a hole 21 (see FIGS. 6 through 8) is left inside the U-turned portion 11a in the housing 13 by drawing the pin 20 out of the resin material 12. Consequently, the probe 10 is weakened near the detector K. If a pushing force F (see FIG. 6), caused by contact with the rotor 2, is applied to the top end 10a of the probe 10, the probe is easily broken, or the U-turned portion 11a is deflected into the hole 21, thereby displacing the disconnection position of the U-turned portion 11a.

Although it is possible to increase the strength of the probe 10 and to prevent the deflection of the U-turned portion 11a by filling the hole 21 with a resin material, this filling material increases the number of parts and the steps of producing the probe.

SUMMARY OF THE INVENTION

An object of the present invention is to provide a wear-detection probe for a brake lining, which increases the probe's strength and prevents the U-turned portion of the detector from being shifted and avoids an increase of parts and steps of producing the probe.

A wear-detection probe for a brake lining material in accordance with the present invention is directed to a probe in which a detector is formed by bending an insulated electrical wire to make a U-turned portion, said U-turned portion is embedded in a resin-molded housing, and said U-turned portion of said detector is cut off by contact with a rotor when the residual thickness of the brake lining is worn to a predetermined value. The probe of the present invention is characterized in that:

a hole is formed around a part of the inner periphery of said insulated electrical wire in said housing by drawing out of the housing a pin which serves to prevent said wire from being shifted in a mold upon mold-forming; and a reinforcement bridge is integrally formed in said hole by the same resin material as that of said housing.

According to the wear-detection probe for a brake lining material of the present invention, since the reinforcement bridge is integrally formed in the hole made by drawing out of the molded housing the pin which serves to prevent the electrical wire from being shifted in the mold, it is possible to increase the strength of the probe and to position the U-turned portion in the housing by the support of the reinforcement bridge. Also, it is possible to avoid an increase of parts and steps of producing the probe, since the reinforcement bridge is integrally formed in the molded housing.

Figure 1:
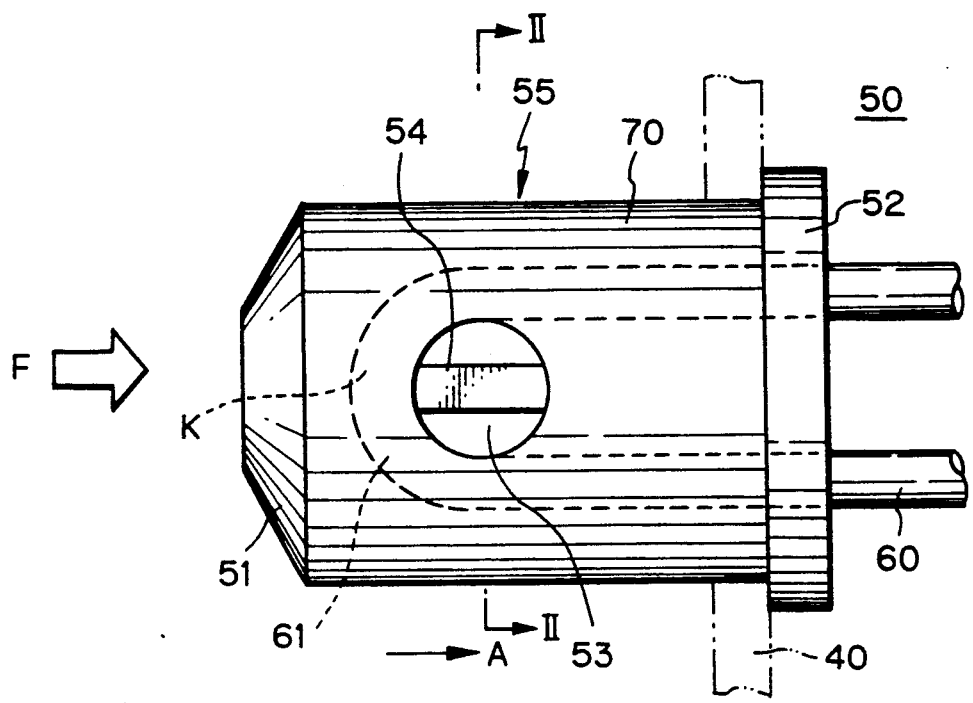
FIG. 1 is a plan view of a wear-detection probe for a brake lining material of an embodiment of the present invention.
Figure 2:
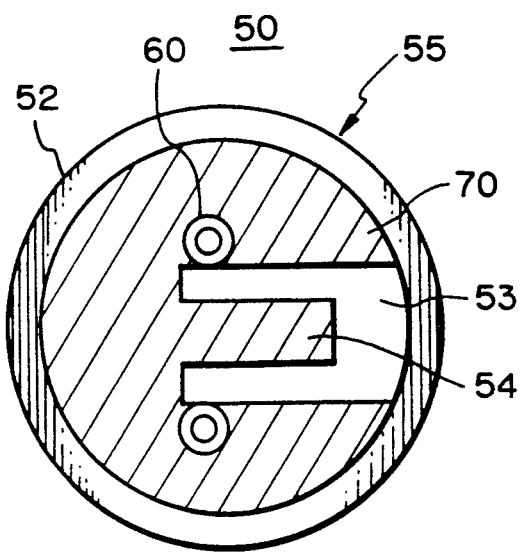
FIG. 2 is a cross-sectional view taken along lines II—II in FIG. 1.
Figure 3:
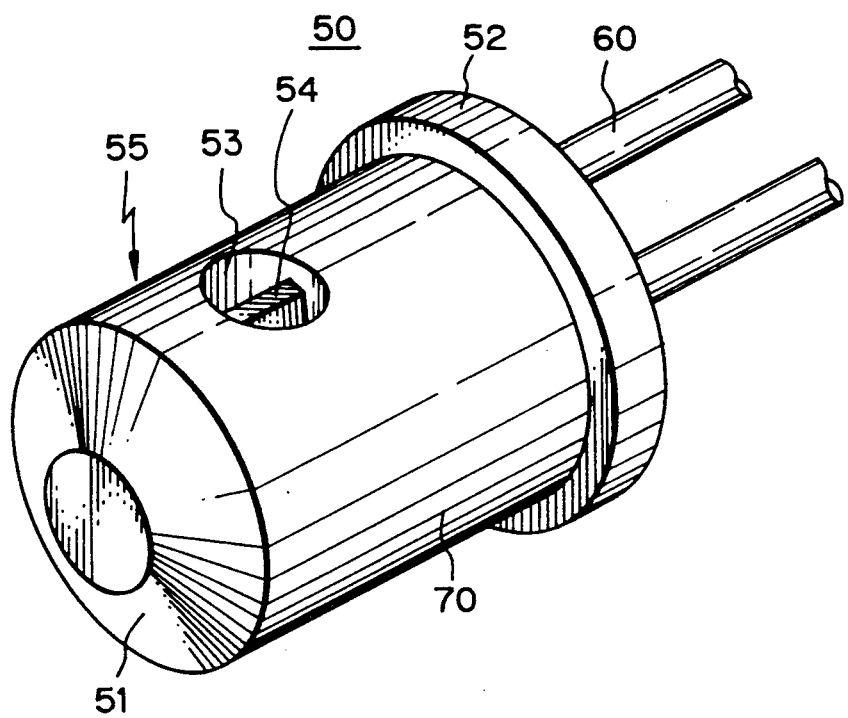
FIG. 3 is a perspective view of the probe shown in FIG. 1.

DETAILED DESCRIPTION OF THE PREFERRED EMBODIMENTS:

Referring now to FIGS. 1 through 3, an embodiment of a wear-detection probe for a brake lining material according to the present invention will be explained below.

As shown in the drawings, a probe 50 comprises a housing 55 molded by a resin material 70, an insulated electrical wire 60, and detector K having a U-turned portion 61 of the wire 60. The U-turned portion 61 is embedded in the resin material 70.

The housing 55 is provided at the base with a flange 52 formed of the resin material 70. A hole 53 is formed in the housing 55 around part of the inner periphery of the U-turned portion 61 by drawing out a pin. A reinforcement bridge 54 made of the resin material 70 is diametrically formed in the hole 53.

Figure 4:
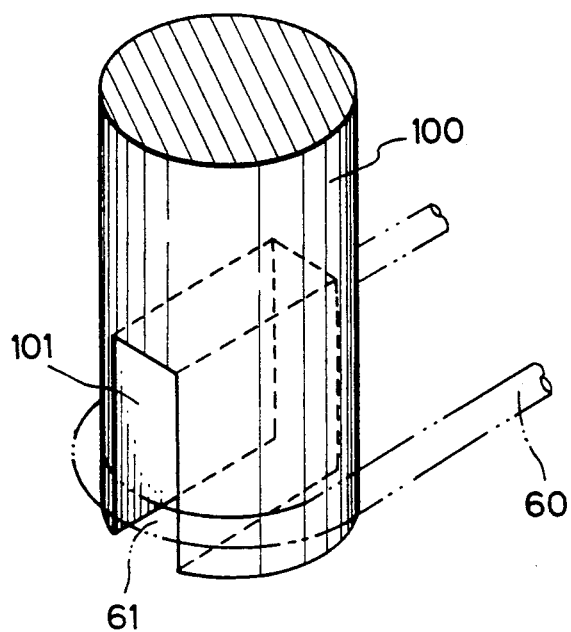
FIG. 4 is a perspective view illustrating a process for producing the probe of the present invention.
Figure 5:
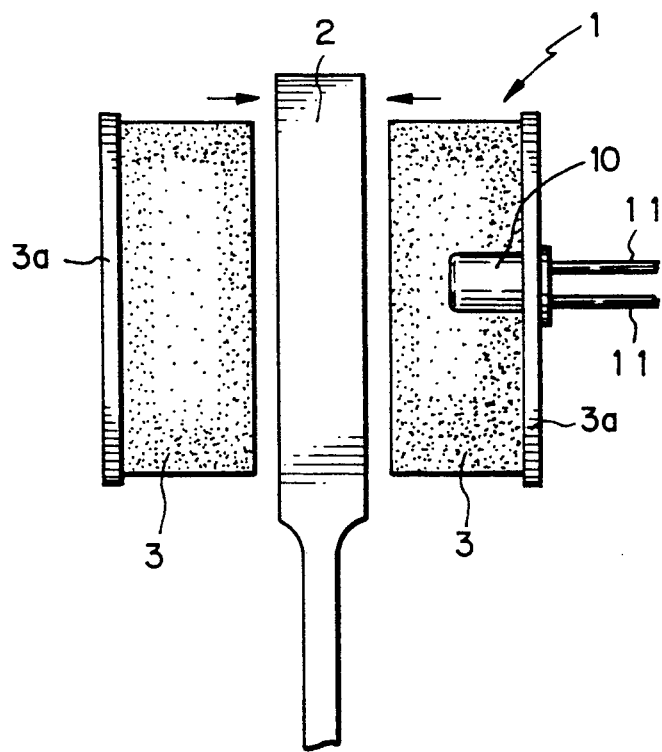
FIG. 5 is a side view showing a conventional disc brake for a vehicle.
Figure 6:
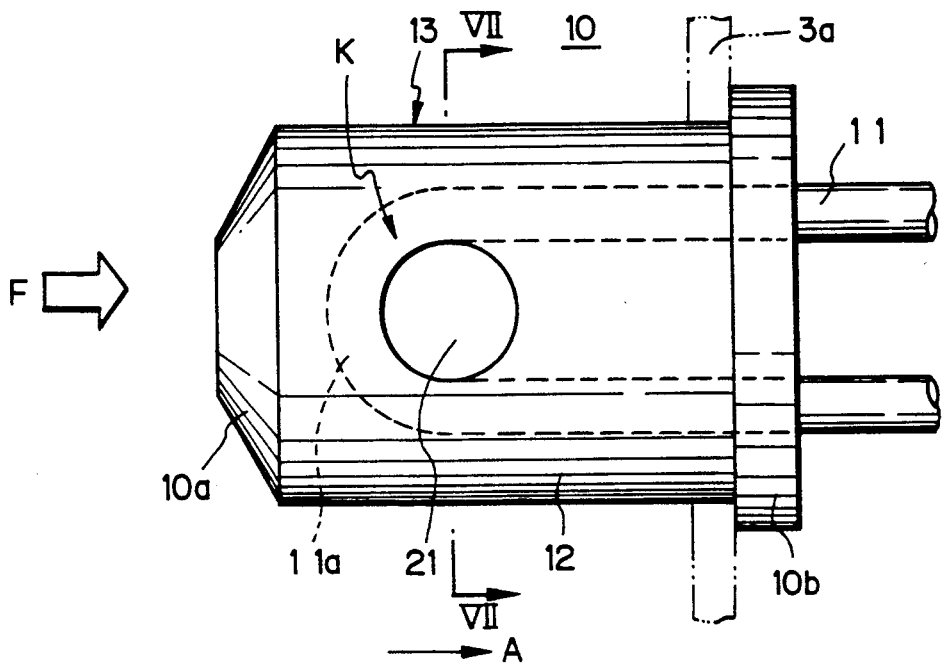
FIG. 6 is a plan view of a conventional wear-detection prove for a brake lining material.
Figure 7:
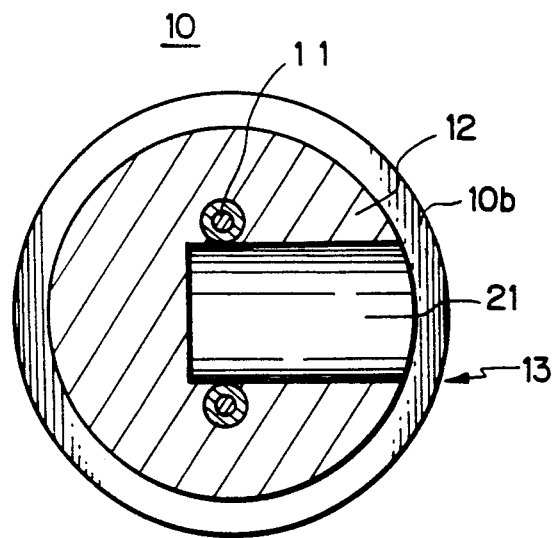
FIG. 7 is a cross-sectional view taken along lines VII—VII in FIG. 6.
Figure 8:
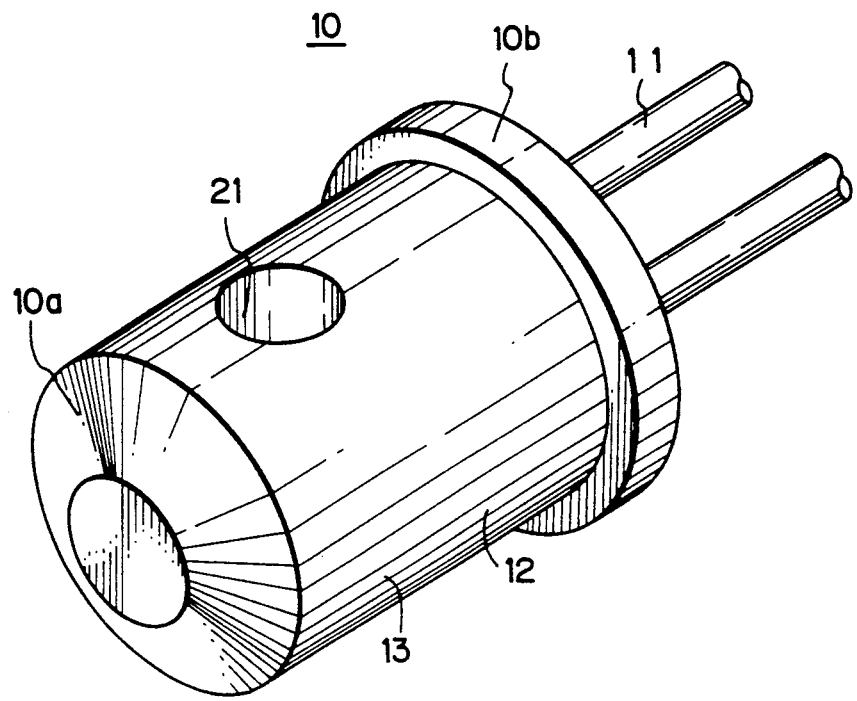
FIG. 8 is a perspective view of the conventional probe shown in FIG. 6.
Figure 9:
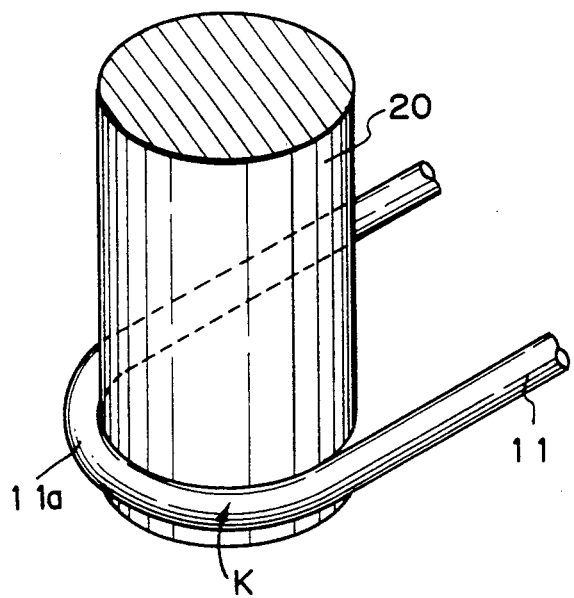
FIG. 9 is a perspective view illustrating the conventional process for producing the conventional probe.

When producing the probe 50, as shown in FIG. 4, a mold (not shown) with a pin 100 is prepared first. The pin 100 serves to prevent the electrical wire from shifting in the mold and has a groove 101 for forming the reinforcement bridge 54 in the wear-progressing direction A (see FIG. 1). Second, the insulated electrical wire 60 is disposed around the end of the pin 100 to form the U-turned portion 61. Third, after closing the mold, a molten resin material is poured into the mold. Fourth, after the resin material has solidified, the formed product is drawn out of the mold. Finally, by drawing out the pin 100 from the formed product, the probe 50 is made with a hole 53 being left in the housing 55 and the reinforcement bridge 55 being formed in the hole 53 diametrically and in the wear-progressing direction A (see FIG. 1).

The probe 50 is attached to a disc brake for a vehicle (not shown) in the following manner. As shown in FIG. 1, the flange 52 of the probe 50 is secured to the rear metal 40 of a brake pad (not shown) so that the top end 51 of the probe 50 is directed to the rotor (not shown) adjacent to the side of the brake pad, and both ends of the insulated electrical wire 60 are drawn out of the probe so as to be connected to an alarm circuit (not shown).

In this probe 50, the brake pad is worn due to contact with the rotor every time the brake is operated, and the top end 51 of the probe 50 is also worn with reduction of the residual thickness of the brake pad. Consequently, the U-turned portion 61 is gradually worn. When the residual thickness of the brake pad reaches a predetermined value, the U-turned portion 61 is cut off and the alarm circuit generates a warning signal.

Since the reinforcing bridge 54 is formed in the hole 53 made by drawing out the pin, the probe 50 is improved in strength. Accordingly, even if a pushing force F caused by contact with the rotor is applied to the top end 51 of the probe 50, the top end 51 is not broken but only worn. Further, since it is possible to position the U-turned portion 61 in the probe 50 by the support of the reinforcement bridge 54, the U-turned portion 61 is prevented from being shifted in the probe 50 even when the pushing force F is applied to the probe 50. Consequently, it is possible to accurately detect the predetermined residual thickness of the brake pad. In particular, since the reinforcement bridge 54 is formed in the hole 53 in the wear-progressing direction A, the prove has sufficient strength to hold up against the pushing force F parallel to the direction A.

Also, since the reinforcement bridge 54 is integrally formed in the resin material 70 upon molding, it is possible to avoid an increase of parts and steps of producing the probe.

Although the probe 50 is disposed adjacent to the side of the brake pad in the above embodiment, the probe 50 may be embedded in the brake pad.

Although the above probe is used to detect wear of a brake pad in a disc brake, the probe may be used to detect wear of a lining shoe for a drum brake or a similar brake lining material.

According to the wear-detection probe for a brake lining material of the present invention, since the reinforcement bridge is integrally formed in the hole made by drawing out of the molded housing the pin which serves to prevent the electrical wire from being shifted in the mold, it is possible to increase the strength of the probe and to position the U-turned portion in the housing by the support of the reinforcement bridge. Also, it is possible to avoid an increase of parts and steps of producing the probe, since the reinforcement bridge is integrally formed in the molded housing.

What is claimed is:

1. A wear detection probe for a brake lining material, comprising:
    a housing composed of a molded resin material;
    an insulated electrical wire including a U-turned portion, said U-turned portion being imbedded within the molded resin material of said housing;
    a hole disposed in said housing, a circumference of said hole being located within an area bounded by an inner periphery of said U-turned portion; and
    a reinforcement bridge integral with said housing composed of the same molded resin material as said housing, and bridging said hole,
    such that when said wear detection probe is embedded within a brake lining, said U-turned portion of said insulated electrical wire is supported by said reinforcement bridge, and is severed by contact with a rotor when a residual thickness of the brake lining is worn to a predetermined value.

2. A method of making a wear detection probe for a brake lining, comprising the steps of:
    (a) bending an electrical wire around a pin until a U-turned portion of the electrical wire is formed about the pin, the pin having a notch disposed therein;
    (b) forming a resin molded housing about the U-turned portion of the electrical wire, so that the resin material surrounds the U-turned portion of the electrical wire and fills the notch; and
    (c) drawing the pin out of the housing so that the molded resin material which filled the notch remains thereby forming a reinforcement bridge to support the U-turned portion of the electrical wire.

* * * * *